Figure 1:
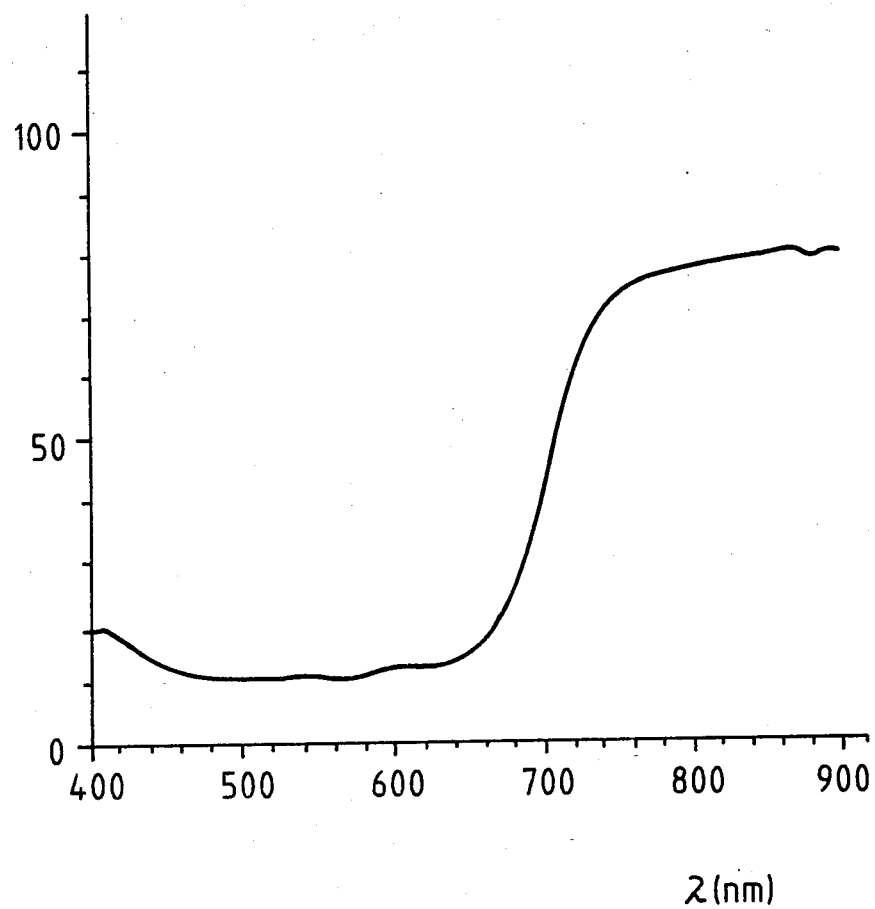

United States Patent [19]

Graser

[11] Patent Number: 4,725,690

[45] Date of Patent: Feb. 16, 1988

[54] PERYLENE-3,4,9,10-TETRACARBOXYLIC ACID DIIMIDE DYE

[75] Inventor: Fritz Graser, Ludwigshafen, Fed. Rep. of Germany

[73] Assignee: BASF Aktiengesellschaft, Ludwigshafen, Fed. Rep. of Germany

[21] Appl. No.: 876,421

[22] Filed: Jun. 20, 1986

[30] Foreign Application Priority Data

Jun. 26, 1985 [DE] Fed. Rep. of Germany ....... 3522743

[51] Int. Cl.$^4$ .......................................... C07D 471/06
[52] U.S. Cl. .................................................. 546/37
[58] Field of Search .......................................... 546/37

[56] References Cited

U.S. PATENT DOCUMENTS 4,517,270  5/1985  Graser et al. ............... 546/37 X
4,599,408  7/1986  Spietschka et al. ......... 546/37 X

FOREIGN PATENT DOCUMENTS 2451780  2/1976  Fed. Rep. of Germany ........ 546/37

Primary Examiner—Donald G. Daus
Assistant Examiner—William A. Teoli, Jr.
Attorney, Agent, or Firm—Oblon, Fisher, Spivak, McClelland & Maier

[57] ABSTRACT

A novel perylene-3,4,9,10-tetracarboxylic acid diimide of the formula

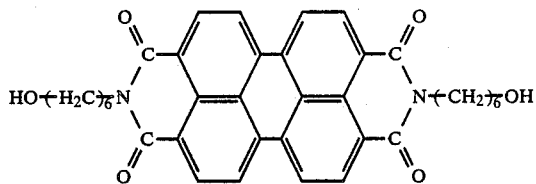

is very useful as a black dye or, together with white pigments, as a gray dye.

1 Claim, 3 Drawing Figures

PERYLENE-3,4,9,10-TETRACARBOXYLIC ACID DIIMIDE DYE

The present invention provides a novel perylene-3,4,9,10-tetracarboxylic acid diimide of the formula

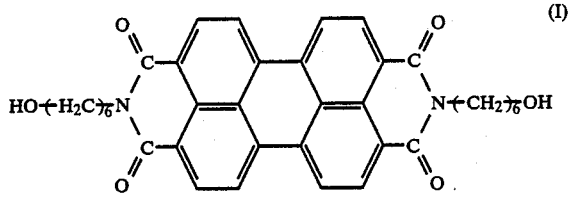

and its use as a dye.

The novel perylenetetracarboxylic diimide is very suitable as a black or gray dye for polyethylene, polyvinyl chloride, surface coatings, inks and aqueous dye formulations. The black to gray colorations obtained in these or with these media have good fastness characteristics. This applies to media which have little or no dissolving power for the diimide (I), so that the pigment is present in the medium in its crystalline form, with which the black color is associated. Since the dissolving power of plastics increases with temperature, (I) is suitable for use as a black pigment only in those media which are colored and processed below 200° C. and therefore do not dissolve the pigment. This is the case for the above thermoplastics, surface coatings, inks and aqueous dye formulations.

When the diimide (I) is incorporated into polystyrene, a polycarbonate or a polyacrylate, a process which as a rule has to be carried out at above 200° C., some of the diimide is dissolved by the thermoplastic as the temperature increases, and, at a sufficiently high temperature, the diimide is finally completely dissolved. Orange colorations which fluoresce in a transparent composition and also have good lightfastness are finally obtained from the black pigment, via reddish black or, as a white reduction, reddish gray colorations. In the orange compositions, (I) is dissolved in the form of a molecular dispersion, which is obtained in particular when the concentration of (I) is lower than the dissolving power of the thermoplastic for (I) at the processing temperature.

The diimide (I) is of particular interest as a black dye for producing black to olive colorations. The dye exhibits excellent lightfastness and weathering fastness, very good fastness to overcoating and very good fastness to plasticizers. (I) can also be mixed with other dyes to formulate other dark hues, for example olive hues for military articles. Gray hues can be obtained by mixing with white pigments, for example titanium dioxide. The novel dye (I) is of particular interest for coloring surface coatings and polyvinyl chloride.

In the infrared range, the dye (I) exhibits excellent reflectance and is therefore very suitable for the production of camouflage colors. The infrared reflectance is similar to that of chlorophyll, ie. the reflectance at 650 nm is no greater than that at 550 nm. When the dye is mixed with a white pigment, eg. titanium dioxide, the coloration exhibits the important decrease in reflectance between 550 and 700 nm, and the desired steep increase in reflectance from 650 nm.

The black pigment having the most similar constitution is perylene-3,4,9,10-tetracarboxylic acid N,N'-bis-(γ-hydroxy-n-propylimide), which is disclosed in German Patent No. 2,451,780 and, as a white reduction, gives pronounced reddish gray colorations and therefore cannot be used universally. Moreover, the prior art pigment does not exhibit the required, important decrease in infrared reflectance between 550 and 700 nm (cf. FIG. 1).

It was not to be foreseen that the diimide (I) would be a black pigment and have the required properties. For example, the hydroxyl-free compound perylene-3,4,9,10-tetracarboxylic acid N,N'-bis-(n-hexylimide) is a red pigment (German Published Application No. DAS 1,130,099). The black color of the pigment particles of the diimide (I) depends on the structure of the crystal lattice, and the latter can be neither deduced from the molecular structure nor predicted. According to F. Graser and E. Hädicke, Liebigs Annalen der Chemie 1980, 1994 et seq. and 1984, 483 et seq., this applies very generally.

The diimide (I) is prepared in a conventional manner by reacting perylene-3,4,9,10-tetracarboxylic acid or its dianhydride with 6-hydroxyhexylamine in water or in an organic solvent at elevated temperatures, under atmospheric or superatmospheric pressure.

The synthesized crude diimide (I) (crude pigment) can be used as obtained or can be converted in a conventional manner into particular finished forms, by additional measures, for example by conversion into a finely divided form by reprecipitation from sulfuric acid or by milling, with or without subsequent recrystallization in water and/or organic solvents, if necessary at elevated temperatures.

The Examples which follow illustrate the invention. Parts and percentages are by weight.

EXAMPLE 1

110 parts of perylenetetracarboxylic dianhydride and 85 parts of 6-hydroxy-n-hexylamine in 600 parts of ethylene glycol are heated to 170°–175° C. while stirring, and kept at this temperature until perylenetetracarboxylic acid is no longer detectable, which is the case after about 1 hour. The mixture is allowed to cool to about 80° C., diluted with 300 parts of methanol and filtered at about 40° C. The residue is washed with 200 parts of methanol and then with water and is dried. Yield: 150 parts of perylenetetracarboxylic acid bis-(6-hydroxy-n-hexylimide) as a black powder which melts at above 350° C.

Analysis: $C_{36}H_{34}N_2O_6$ (590.6); calculated: 73.20% C, 5.80% H, 4.74% N; found: 72.5% C, 5.6% H, 4.7% N.

For use as a pigment, the product obtained in the synthesis (crude pigment) can be
(a) used directly or
(b) finely milled in a high speed stirred ball mill, as described in German Published Application No. DAS 2,832,761, (U.S. Pat. No. 4,262,851), Example 1, pigment of fairly high color strength being obtained.

EXAMPLE 2

78.4 parts of perylenetetracarboxylic dianhydride and 60.8 parts of 6-hydroxy-n-hexylamine are introduced into 1000 parts of water, and the stirred mixture is heated to 130°–135° C. in a pressure-tight closed reaction vessel. After the mixture has been kept at this temperature for 5 hours, free perylenetetracarboxylic acid is no longer detectable in a sample. The reaction mixture is cooled, the pressure is released, the mixture is diluted with hot water and filtered, and the residue is washed neutral with hot water and dried at 80° C. under reduced pressure. Yield: 107.5 parts of perylenetetracarboxylic acid bis-(6-hydroxy-n-hexylimide) as a black powder which melts at about 360° C. The dye can be used directly in this crude form for coloring, or can be converted beforehand into a form of greater color strength by wet milling, as described in Example 1 (b).

Analysis: $C_{36}H_{34}N_2O_6$ (590.6); calculated: 73.20% C, 5.80% H, 4.74% N; found: 72.8% C, 5.9% H, 4.7% N.

EXAMPLE 1 OF USE

10% strength full-shade baking finish (a) 30% strength full-shade paste 3 parts of the dye of Example 1 (crude synthetic product) and 7 parts of a varnish-like binder (Grinding Base 100 S from Lawter Chemicals Inc., Chicago) are processed on a three-roll mill in 6 passes under 80 bar, to give a 30% strength full-shade paste.

(b) 10% strength full-shade paste 2 parts of the full-shade paste (a) are mixed with 4 parts of a binder mixture consisting of 1 part of an alkyd resin modified with soybean oil, 2 parts of an alkyd resin modified with a synthetic fatty acid, and 3 parts of a solvent-free melamine resin.

(c) Coloring procedure

A 100 μm thick layer of the full-shade surface-coating paste (b) is applied onto white cardboard by means of a film-casting apparatus, and baked for 45 minutes at 120° C.

A black coloration possessing excellent lightfastness and weathering fastness is obtained.

A very similar coloration is obtained if the dye obtained as described in Example 2 is used instead of the dye of Example 1.

EXAMPLE 2 OF USE

Baking finish (1:4 white reduction)

(a) 30% strength white paste 42 parts of a binder, obtained by mixing 1 part of an alkyd resin modified with soybean oil with 2 parts of an alkyd resin modified with a synthetic fatty acid, 30 parts of titanium dioxide (rutile), 22 parts of a solvent-free melamine resin and 6 parts of a colloidal silica are milled on a three-roll mill under 80 bar in 6 passes, to give a 30% strength white paste.

(b) Surface coating paste 2.5 parts of the 30% strength full-shade paste of Use Example 1 (a) and 10 parts of the 30% strength white paste (a) are mixed and milled in a disc mill.

(c) Coloring procedure

A 100 μm thick layer of the surface-coating paste (b) is applied onto cardboard by means of a film casting apparatus, and baked for 45 minutes at 120° C. A gray coloration having excellent lightfastness is obtained.

Between 400 and 900 nm, the coloration shows the reflectance values below, measured with a Zeiss DM 26 spectrophotometer, against absolute white as a standard:

| λ (nm) | 400 | 420 | 440 | 460 | 480 | 500 | 520 |
|---|---|---|---|---|---|---|---|
| reflectance (%) | 29.24 | 35.07 | 33.04 | 31.39 | 30.13 | 29.39 | 28.92 |
| λ (nm) | 540 | 560 | 580 | 600 | 620 | 640 | 660 |
| reflectance (%) | 28.24 | 27.56 | 26.64 | 25.81 | 25.46 | 26.65 | 32.96 |
| λ (nm) | 680 | 700 | 720 | 740 | 760 | 780 | 800 |
| reflectance (%) | 48.76 | 64.07 | 70.79 | 73.40 | 75.65 | 77.09 | 77.62 |
| λ (nm) | 850 | 900 | | | | | |
| reflectance (%) | 80.98 | 83.68 | | | | | |

Figure 2:
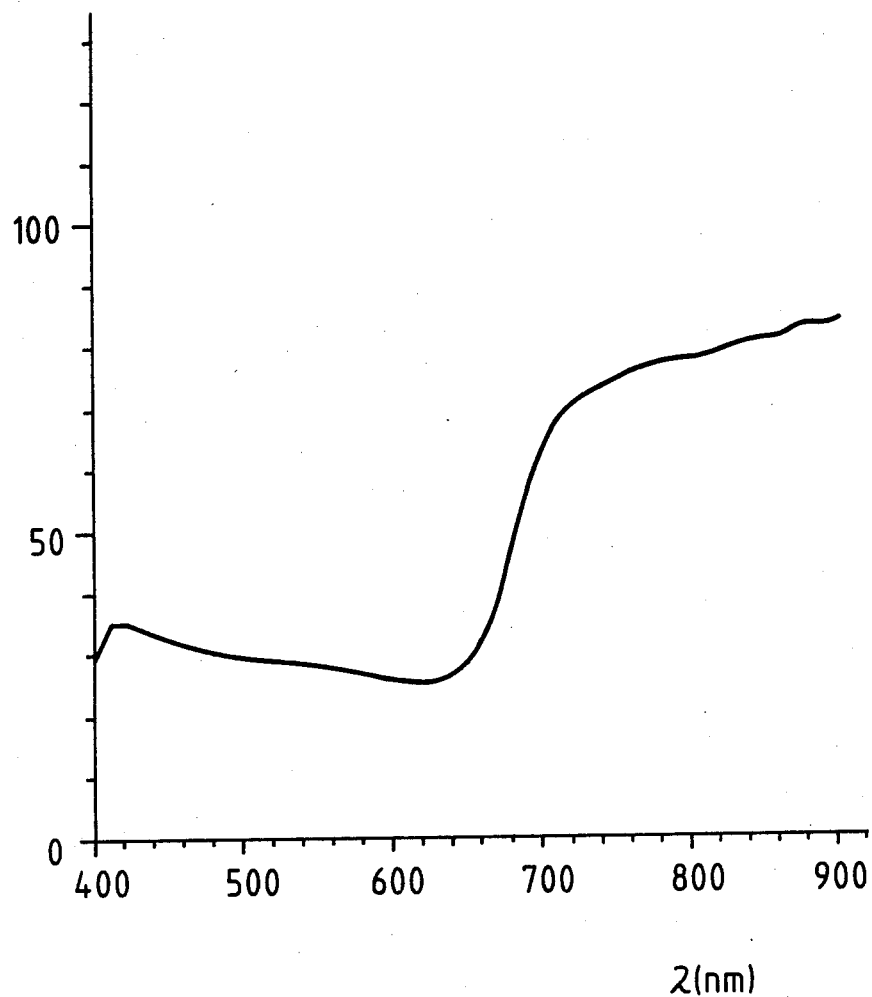

FIG. 2 (attached) shows the reflectance in %, based on absolute white, as a function of the wavelength.

Very similar colorations and infrared reflectance values are obtained when the dye obtained as described in Example 2 is used instead of the dye of Example 1.

EXAMPLE 3 OF USE

Backing finish (1:4 white reduction)

The procedure described in use Example 2 is followed, except that the surface coating paste 2 (b) is prepared using a 30% strength full-shade paste obtained similarly to Use Example 1 (a) and using the milled product obtained as described in Example 1 (b), and a deep gray coloration of excellent lightfastness is obtained.

Between 400 and 900 nm, the coloration shows the reflectance values below, measured with a Zeiss DM 26 spectrophotometer, against absolute white as the standard:

| λ (nm) | 400 | 420 | 440 | 460 | 480 | 500 | 520 |
|---|---|---|---|---|---|---|---|
| reflectance (%) | 22.64 | 22.54 | 18.68 | 16.76 | 15.97 | 16.05 | 16.29 |
| λ (nm) | 540 | 560 | 580 | 600 | 620 | 640 | 660 |
| reflectance (%) | 15.69 | 15.15 | 14.20 | 13.72 | 14.21 | 17.33 | 26.44 |
| λ (nm) | 680 | 700 | 720 | 740 | 760 | 780 | 800 |
| reflectance (%) | 42.18 | 58.67 | 71.26 | 78.17 | 81.23 | 82.72 | 83.49 |
| λ (nm) | 850 | 900 | | | | | |
| reflectance (%) | 85.25 | 85.99 | | | | | |

Figure 3:
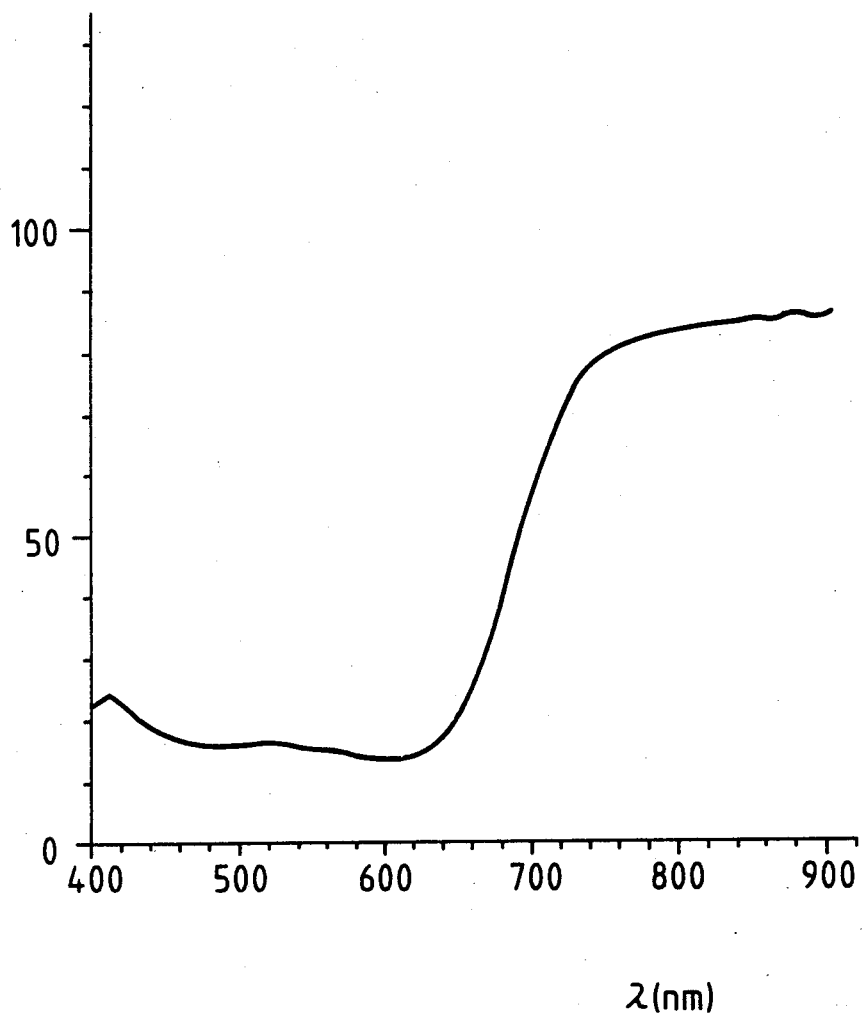

FIG. 3 (attached) shows the reflectance in %, based on absolute white, as a function of the wavelength.

Very similar colorations and infrared reflectance values are obtained if the dye obtained as described in Example 1 and finely milled as described in Example 1 (b) is used instead of the finely milled dye of Example 2.

EXAMPLE 4 OF USE 0.25 part of a crude dye, obtained as described in Example 1, 2.5 partS of titanium dioxide (rutile) and 50 parts of a mixture of 65 parts of polyvinyl chloride powder, 35 parts of diethylhexyl phthalate and 2 parts of dibutyltin bis-(hexylthioglycolate) are homogenized on a roll mill at from 150° to 160° C. for about 8 minutes and milled to give hides, and the hides are polished on a calender. Gray sheets having excellent lightfastness and very good fastness to plasticizers are obtained.

If 0.5 part, instead of 0.25 part, of dye and 0.25 part, instead of 2.5 parts, of titanium dioxide are used, black sheets having excellent lightfastness and very good fastness to plasticizers are obtained.

Similar colorations are obtained if the dye obtained as described in Example 2 is used instead of the dye of Example 1.

EXAMPLE 5 OF USE 0.1 part of the crude pigment from Example 1, 100 parts of high pressure polyethylene powder and 1 part of titanium dioxide (rutile) are dry-blended in a drum mixer. The mixture is melted and homogenized in an extruder at a barrel temperature of from 160° to 180° C. The colored plastic mass is granulated by die face cutting or by drawing strands and cooling these. The resulting granules are then molded at 200° C. on an injection molding machine or compression-molded in a press to give articles of any desired shape. Gray articles having excellent lightfastness are obtained.

EXAMPLE 6 OF USE 0.008 part of the dye obtained as described in Example 1 is dry-blended with 100 parts of a milled polystyrene block polymer in a drum mixer. The mixture is melted and homogenized in an extruder at a barrel temperature of from 200° to 250° C. The colored plastic mass is granulated by die face cutting or by drawing strands and cooling these. The resulting granules are then molded at from 240° to 280° C. on an injection-molding machine or compression-molded in a press to give articles of any desired shape. Liminous yellowish orange articles which have very good lightfastness and fluoresce in a similar hue are obtained.

Instead of the polystyrene block polymer, it is also possible to use a polystyrene emulsion or suspension polymer or copolymers with butadiene and acrylonitrile or acrylates.

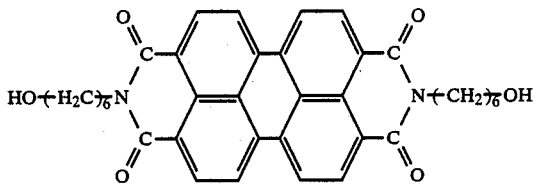

I claim:
1. Perylene-3,4,9,10-tetracarboxylic acid diimide of the formula